US009213962B2

(12) United States Patent
Westaway et al.

(10) Patent No.: US 9,213,962 B2
(45) Date of Patent: Dec. 15, 2015

(54) ONLINE COLLABORATION

(75) Inventors: Jasper Westaway, Sidmouth (GB); John Richard Boyle, Stirling (GB); Ian Duncan Davies, Stirling (GB)

(73) Assignee: Quolos Limited, London (GB)

( * ) Notice: Subject to any disclaimer, the term of this patent is extended or adjusted under 35 U.S.C. 154(b) by 410 days.

(21) Appl. No.: 13/126,992

(22) PCT Filed: Oct. 27, 2009

(86) PCT No.: PCT/GB2009/002555
§ 371 (c)(1),
(2), (4) Date: Jul. 25, 2011

(87) PCT Pub. No.: WO2010/049679
PCT Pub. Date: May 6, 2010

(65) Prior Publication Data
US 2011/0289150 A1  Nov. 24, 2011

(30) Foreign Application Priority Data

Oct. 29, 2008 (GB) .................................. 0819886.3

(51) Int. Cl.
*G06Q 10/10* (2012.01)
*H04L 29/08* (2006.01)

(52) U.S. Cl.
CPC ............ *G06Q 10/107* (2013.01); *H04L 67/104* (2013.01); *H04L 67/1068* (2013.01); *H04L 67/28* (2013.01)

(58) Field of Classification Search
CPC ... H04L 67/104; H04L 67/1068; H04L 67/28; G06Q 10/10
See application file for complete search history.

(56) References Cited

U.S. PATENT DOCUMENTS

| 7,769,810 | B1 * | 8/2010 | Kaufman .................... 709/205 |
| 7,908,325 | B1 * | 3/2011 | Pabla et al. ................ 709/205 |
| 8,271,574 | B1 * | 9/2012 | Srinivasan et al. .......... 709/201 |
| 8,301,724 | B2 * | 10/2012 | Alexander et al. .......... 709/217 |

(Continued)

FOREIGN PATENT DOCUMENTS

| CN | 1283820 A | 2/2001 |
| CN | 1289977 A | 4/2001 |

(Continued)

OTHER PUBLICATIONS

"SynchML;" Wikipedia.org; Sep. 15, 2008; pp. 1-15; http://de.wikipedia.org/w/index.php?title=SyncML&oldid=50768635.

*Primary Examiner* — Backhean Tiv (57) ABSTRACT

A method and an agent (500) are provided for the management and control of data files, in particular, the management of shared documents across a network to enable collaboration between users. The agent (500) comprises a collaborative event manager (180) to detect changes made to an open copy of the file that is associated with a first client device (100); a network manager (155) to determine whether a connection can be made with one or more further clients devices (130) connected to a network (120); and an offline manager (170) couplable to the network manager (155) to persist changes detected by the collaborative event manager (180) when a connection cannot be made; wherein the network manager (155) is adapted to selectively transmit the changes across the network (120) to one or more of the said further client devices (130) when a connection can be made, thereby instructing one or more respective agents to apply said changes to respective copies of said file.

30 Claims, 7 Drawing Sheets

(56) References Cited

U.S. PATENT DOCUMENTS

| | | | |
|---|---|---|---|
| 2002/0062310 A1* | 5/2002 | Marmor et al. | 707/3 |
| 2003/0023691 A1* | 1/2003 | Knauerhase | 709/206 |
| 2004/0024820 A1* | 2/2004 | Ozzie et al. | 709/205 |
| 2004/0088646 A1 | 5/2004 | Yeager et al. | |
| 2004/0267871 A1* | 12/2004 | Pratley et al. | 709/200 |
| 2005/0234943 A1* | 10/2005 | Clarke | 707/100 |
| 2005/0246389 A1* | 11/2005 | Shah et al. | 707/200 |
| 2006/0053196 A1 | 3/2006 | Spataro et al. | |
| 2006/0294053 A1* | 12/2006 | Kojima | 707/1 |
| 2007/0014314 A1 | 1/2007 | O'Neil | |
| 2007/0050448 A1* | 3/2007 | Gonen et al. | 709/204 |
| 2007/0150463 A1* | 6/2007 | Cannella et al. | 707/5 |
| 2007/0150558 A1* | 6/2007 | Teodosiu et al. | 709/220 |
| 2008/0005195 A1* | 1/2008 | Li | 707/203 |
| 2008/0133758 A1* | 6/2008 | Lee et al. | 709/227 |
| 2008/0159286 A1* | 7/2008 | Moore et al. | 370/390 |
| 2008/0301228 A1 | 12/2008 | Flavin | |
| 2009/0125518 A1* | 5/2009 | Bailor et al. | 707/8 |
| 2009/0282041 A1* | 11/2009 | Skaria et al. | 707/8 |
| 2010/0017727 A1* | 1/2010 | Offer et al. | 715/753 |

FOREIGN PATENT DOCUMENTS

| | | |
|---|---|---|
| CN | 1783117 A | 6/2006 |
| EP | 1 589 722 | 10/2005 |
| WO | 2005/114467 | 12/2005 |

* cited by examiner

ONLINE COLLABORATION

FIELD OF THE INVENTION

The present invention relates to the management and control of data files. In particular, the present invention relates to the management of shared documents across a network to enable collaboration between users.

BACKGROUND TO THE INVENTION

Collaboration is an essential part of any organisation. Working in a team increases productivity, shares knowledge and stimulates creativity. It also provides a critical environment for the development of ideas and services. With the growth of cheap international communication systems, such as the network of computers and fibre-optic cabling that comprises the Internet, organisations can collaborate on a global scale across different continents and time-zones. Even at a local level, flexible working practices and the near ubiquitous availability of wireless communication systems, mean that team members may collaborate at the same time in diverse geographical locations or at different times in the same office. Such collaboration may also involve a number of users operating on a number of different network devices.

Most forms of modern collaboration involve the editing of electronic files. These files may comprise, amongst others, word processing documents, spreadsheets, databases, multimedia presentations, audio and video content, computer-program code or proprietary file types. A number of approaches have been proposed in the art to enable collaboration on such files.

A first approach uses a single central repository to maintain a master version of a given file or document. Individual users retrieve (or 'check out') the latest version from the repository and later save (or 'commit') a new copy, including any changes they have made, back to the repository. Well known examples of such arrangements include the Concurrent Versions System (CVS) developed by Richard Grune and Subversion (SVN) developed by CollabNet Incorporated, both of which provide an open source solution to the problem of managing different versions of computer-program code during application development. In certain cases the repository may be provided by a server connected to the Internet. In this case a plurality of client devices may access the repository as an online service to "checkout" and "commit" documents (for example, Microsoft Office Live supplied by Microsoft Corporation).

A similar approach is set out in WO/2005 114467 A2, wherein a remote computer system is provided. The remote computer system acts as a server to a number of workstations and stores a document to be edited as a plurality of linked character objects. Through communication between a workstation and the remote computer system the centrally-stored document may be updated. However, this system suffers from the usual drawbacks associated with a server-centric system as discussed further below.

Document management solutions of this type generally encounter difficulties when more than one user simultaneously edits a document. In such circumstances there may be 'clashes' between the edits made by each user: for example, users A and B check out version 1 of a given document; user A then commits version 1.1 with changes; and user B subsequently commits version 1.2 with changes. At this stage, version 1.2 lacks the changes made by user A.

Merge tools have been proposed that work to merge the changes made in different versions, e.g. versions 1.1 and 1.2 above, such that a consolidated version of the document can be produced. These mechanisms are usually associated with the repository approach, but may also be found in freestanding software such as Microsoft Word, also supplied by Microsoft Corporation. The use of merge tools does not necessarily offer sufficient consistency in all circumstances. For example, if the edits made by users A and B are mutually exclusive (for instance, user A deletes a paragraph while user B adds detail to it) there is the potential for simple merge tools to produce incoherent results.

An alternative approach has been suggested whereby all users edit online a document stored on a central server. In such systems, the document is not checked out for local editing. Instead, each user sets up a connection with the central server and any changes are made directly to a master version of the document stored on the server. An example of a technique of this type is Google Documents, provided by Google Incorporated. However, in order to use systems such as these, users must be online in order to access the centrally stored document. Additionally, users must also be online to edit the document. This may cause problems in situations where the connection to the server is prone to interruption, for example when exchanging data from a moving vehicle using wide area cellular telephone networks.

Another alternative approach to the management of a single document by multiple users is desktop sharing. According to this approach, a first user stores a document and is able to allow remote access to their computer by one or more further users, allowing the further users to temporarily control the application that is used to edit the document. This is similar to the central server approach discussed above, with the difference being that a particular user's machine is used as the server. Examples of this approach include Cisco Webex, provided by Cisco Systems Incorporated, and Microsoft SharedView, provided by Microsoft Corporation. This approach, however, does not allow simultaneous editing of the document by more than one user.

Microsoft Corporation also describe a method, system and apparatus for collaboration in EP 1 589 722 A1. This publication describes a variation of their "OneNote" application. A shared note-taking session is set up between users using a shared session application program interface (API). In this shared session, page synchronisation objects are used to synchronise changes applied to respective pages of a note-taking document. A synchronisation token is required to make changes to a page synchronisation object. While the described method, system and apparatus do address certain problems in real-time collaboration, they are nevertheless inflexible and do not allow for free collaboration. For example, the need for a shared session restricts international collaboration and the need for a synchronisation token generates a certain set of problems that are well-documented in the field of ring network topologies.

A further approach that may be implemented on a common network is to adapt existing message passing software operating on the network. For example, one could write a custom formula for each cell in a spreadsheet such as Microsoft Excel, provided by Microsoft Corporation, that invokes an application such as Tibco Rendezvous, provided by Tibco Software Incorporated to publish a piece of information over the network infrastructure. The disadvantages of this approach are two-fold: firstly, there is a lack of control over the publication of changes, such information is simply placed onto the network for retrieval; and secondly, the author has to explicitly state what information within the document is to be shared and specifically configure the document itself (i.e. has to manually configure each cell) to share such information, not only does this create a much larger document, it requires each document to be customised in a manner that takes time and specialist knowledge.

US2004/0088646 A1 extends the message passing method by passing a mobile agent between nodes, i.e. between computers. The mobile agent may be a Java class. The mobile agent, once it has arrived at a node, may check version information so as to lock a document and send the latest version of a document to other nodes. However, this approach not only suffers the disadvantages of message passing but also those of document locking and sharing as discussed above and below. The mobile agent also may present a security risk.

The limitations on the existing document management techniques outlined above mean that users commonly resort to simply serially distributing a document between collaborators. Often this is achieved by attaching the document to an electronic mail message ("email") addressed to an appropriate user. For example, user A creates version 1.0 and transmits it to user B, who creates version 1.1 and transmits it to user C, and so on. The limitations of this approach are readily apparent: not only is simultaneous editing of the document by more than one user impossible, but users are unable to contribute until it is their turn. Furthermore, the common use of email produces additional problems such as a lack of security and limits on transmitted file size.

Hence, there is a requirement in the art to provide a method and/or a system to enable users to collaborate on a file or document without the problems described above. Such a solution should preferably be easy to use, should enable real-time editing by multiple users and should facilitate, rather than constrain, the collaboration process.

SUMMARY OF THE INVENTION

According to a first aspect of the present invention, there is a computer-implemented method for enabling collaboration in the editing of a file, the method comprising:
detecting changes made to an open copy of the file that is associated with a first client device;
determining whether a connection can be made with one or more further clients devices connected to a network;
when a network connection cannot be made, persisting the detected changes; and,
when a network connection can be made, selectively transmitting the changes across the network to said one or more further clients devices, thereby instructing one or more respective agents to apply said changes to respective copies of said file.

The present invention ensures that all copies of files on a network are synchronized and up to date while still allowing the user to edit the files locally. It does so by allowing change in real time or near real-time through existing applications used to edit the files. This ensures consistency at all times in the changes made to the files, and also allows files to be edited by different applications at each user's machine.

The present invention allows more than one user to simultaneously edit the file without risk of conflict, since each user is able to observe the changes made by others in real time or near real-time.

It is notable that the present invention does not attempt to store a 'master' copy of the file at a central location which is updated each time a user saves the file. Nor does the present invention transmit saved and updated versions of the file to each user. Instead, only the changes made are transmitted across the network, and these may be applied separately by agents and file-editing applications used by each user.

Preferably, the method further comprises:
receiving changes from one or more other agents over the network; and
applying the received changes to a copy of the file associated with the first client device.

Preferably, the changes are applied using an application associated with the first client device. The changes applied to a copy of a file may be applied to an open copy of the file.

Preferably, the method further comprises:
receiving notification of a new shared file over the network; and
generating a new copy of the new shared file that is associated with the first client device.

Preferably, persisting changes comprises storing the detected changes. In certain embodiments, the method may comprise directly apply the changes to the copy of the file without it being open, i.e. without the use of an application.

Preferably, the step of selectively transmitting comprises only transmitting the changes to one or more further client devices connected to the network that are associated with users with whom the file has been shared.

Preferably, a client device is associated with a user through the presence of an agent registered to the user. Preferably, the step of detecting changes further comprises:
loading an appropriate document handler that is adapted to interact with an application being used to edit the file;
wherein the document handler transforms the changes from a format specific to the application to an application-independent format.

Preferably, the step of selectively transmitting comprises:
determining whether a direct connection can be made with a selected client device;
if a direct connection can be made, making said connection; and
if a direct connection cannot be made, making a connection with an intermediate device to route data to the selected client device.

According to a second aspect of the present invention there is provided a computer program product comprising computer executable instructions for carrying out the method described above.

According to a third aspect of the present invention there is provided an agent for enabling collaboration in the editing of a shared file, the agent comprising:
a collaborative event manager to detect changes made to an open copy of the file that is associated with a first client device;
a network manager to determine whether a connection can be made with one or more further clients devices connected to a network; and
an offline manager couplable to the network manager to persist changes detected by the collaborative event manager when a connection cannot be made;
wherein the network manager is adapted to selectively transmit the changes across the network to one or more of the said further client devices when a connection can be made, thereby instructing one or more respective agents to apply said changes to respective copies of said file.

The third aspect of the present invention providing the same advantages discussed in relation to the first aspect of the invention.

Preferably, the network manager is adapted to receive changes from one or more other agents over the network relating to the shared file; and the collaborative event manager is adapted to apply said changes to a copy of the file associated with the first client device.

Preferably, the one or more respective agents and/or the collaborative event manager are adapted to apply said changes to an open copy of the appropriate file or files.

Preferably, the collaborative event manager is adapted to apply said changes using an application loaded upon the first client device.

Preferably, the agent further comprises: a file system manager to receive notification of a new shared file from the network manager and generate a copy of said new shared file that is associated with the first client device.

Preferably, the file system manager is adapted to interact with a file system of the first client device.

Preferably, the offline manager is adapted to interact with a file system of the first client device. The offline manager may be adapted to receive changes from the collaborative event manager when the copy of the shared file is not open. In certain embodiments, the offline manager may be adapted to directly apply the changes to the copy of the file without it being open, i.e. without the use of an application.

Preferably, when the client device connects to the network, the network manager is adapted to selectively transmit any changes that were stored by the offline manager.

Preferably, the network manager selectively transmits the changes to one or more further client devices connected to the network that are associated with users with whom the file has been shared.

Preferably, a client device is associated with a user by the presence of an agent registered to the user.

Preferably, the network manager is adapted to: determine whether a direct connection can be made to a selected client device; based on said determination, if a direct connection can be made, make a direct connection; and based on said determination, if a direct connection cannot be made, make a connection with an intermediate device to route data to the selected client device.

Preferably, in any of the above aspects, the changes are made by a first user to a first memory copy of the file, the first memory copy being created for real-time editing by a file-editing application when the first user opens the file. In addition, the one or more further client devices may be associated with one or more respective users sharing the file and the application of the changes may be applied to memory copies of said file by file-editing applications operated by the one or more respective users, said memory copies being created when the one or more respective users open the file.

Preferably, the real-time change component comprises a monitor component that detects changes made to the open copy of the file without modifying said copy of the file.

A router may be provided for enabling connectivity between a plurality of users in the editing of a file, the router comprising:

a receiving device for receiving changes to be applied to a shared file from a first agent across a network, said changes to be applied to a copy of the file associated with a selected client device that is not, at the time of receipt, connected to the network; and a transmitting device to transmit said changes to the selected client device, thereby instructing a respective second agent to apply said changes to a copy of the file that is associated with the selected client device.

Preferably, the router further comprises: a routing manager for receiving a request from a third agent to connect to a fourth agent across the network, the routing manage being adapted to route data from the third agent to the fourth agent across the network.

Preferably, the first to fourth agents are any agents associated with the plurality of users.

BRIEF DESCRIPTION OF THE FIGURES

Preferred embodiments of the present invention will now be described with reference to the accompanying figures, in which.

DETAILED DESCRIPTION

The present invention presents a method and system for the management of electronic files. Such a method and system enables collaboration between users. The system makes use of agents operating upon user client devices. Agents may be seen as components implemented by computer-program code loaded into working memory of a client device, such program code being processed by a processor of the client device to provide the functionality described below. However, agents should not be limited to components implemented by computer-program code and may comprise suitably configured electronic circuitry, whether fixed or programmable; for example, an agent may comprise circuitry configured to communicate over a universal system bus (USB) with a client device to provide said functionality.

Figure 1:
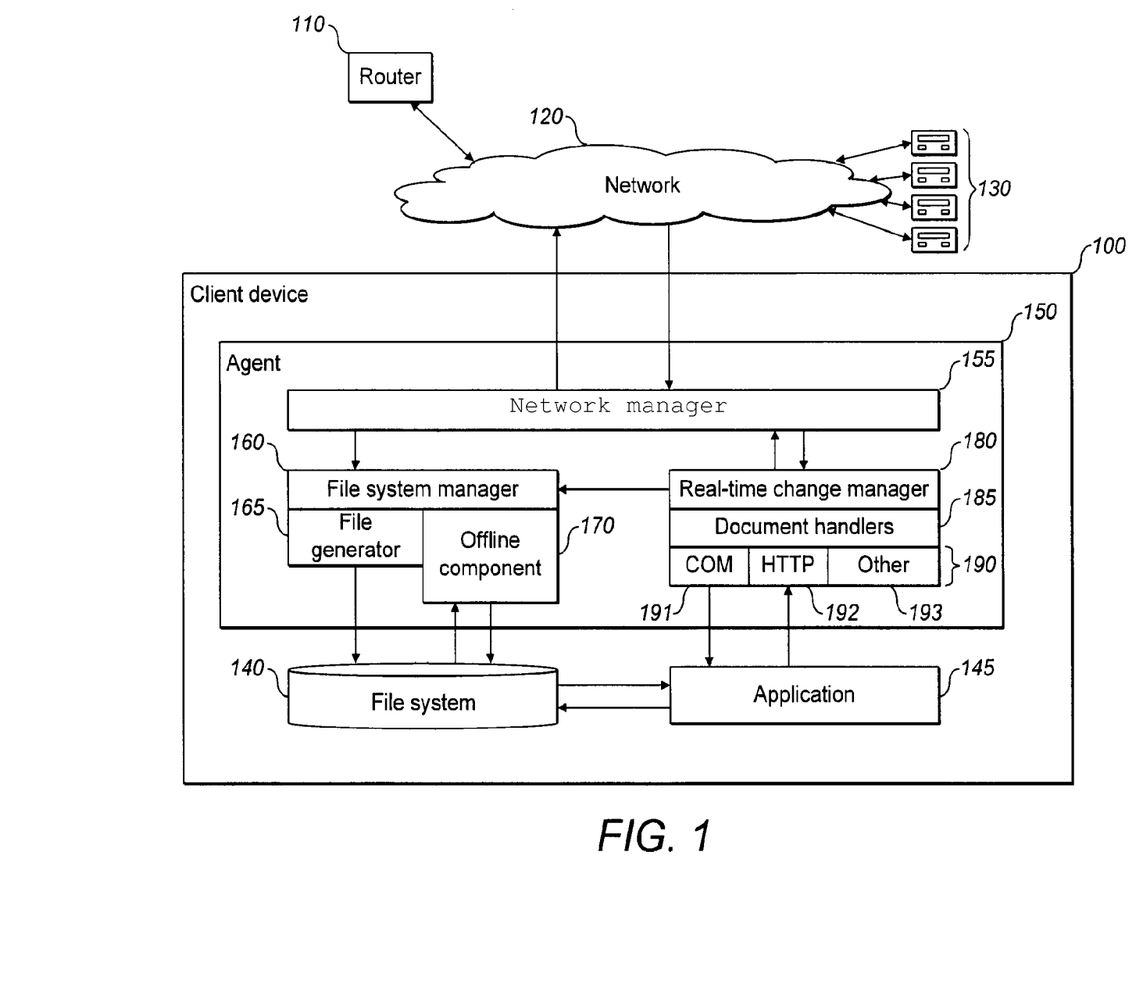
FIG. 1 illustrates the architecture of an exemplary agent used in accordance with the present invention.

FIG. 1 illustrates the functional relationship between various exemplary components employed in the implementation of the present invention. FIG. 1 shows a client device 100 that is operated by a user. The client device 100 is operably connected to a network 120. Also connected to the network 120 are a router 110 and a plurality of other client devices 130 operated by respective users.

Figure 7:
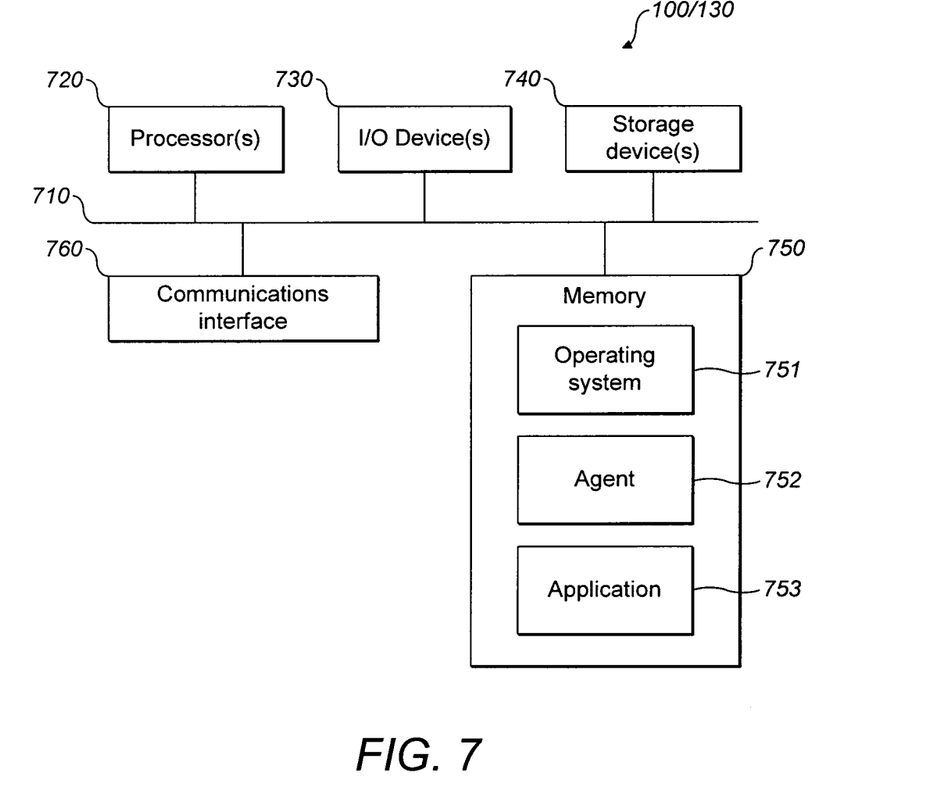
FIG. 7 illustrates the architecture of an exemplary computer system that may be used in the implementation of the present invention.

Any one of client device 100, router 110 and other client devices 130 may be implemented using the computer system of FIG. 7. FIG. 7 is provided as an example for the purposes of explaining the invention and one skilled in the art would be aware that the components of each system may differ depending on requirements and user preference. The computer system of FIG. 7 comprises one or more processors 720 connected to a system bus 710. Also connected to the system bus 710 is working memory 750, which may comprise any random access or read only memory (RAM/ROM), and communications interface 760, which enables communication over network 120. The computer system may also optionally comprise one or more storage devices 740 and additional input/output (I/O) devices 730. Storage devices 740 may be any known local or remote storage system using any form of known storage media. In use, computer program code is loaded into working memory 750 to be processed by the one or more processors 720. In the example of FIG. 7, an operating system (OS) 751 is loaded into memory 750 together with computer-program code 752 for implementing either agent or server functionality and computer-program code 753 for implementing one or more applications. The OS 751 and/or the agent or server 752 may comprise suitably configured computer program code to enable the proper functioning of the computer system.

In the present example, network 120 comprises the Internet, i.e. a combination of interconnected networks that use a common Transmission Control Protocol/Internet Protocol (TCP/IP). However, network 120 may also comprise a Local Area Network (LAN), a Wide Area Network (WAN), or a combination of the two and may use any known networking protocol (e.g. User Datagram Protocol (UDP) etc). Network 120 may also be common to a particular organisation, or may represent a plurality of networks managed by various organisations, connected using appropriate hardware.

Returning to FIG. 1, client device 100 implements an agent 150. Agent 150 typically comprises a persistent system component that is implemented while creating, editing or deleting a file or document. Agent 150 is configured to communicate across the network 120 and to control the transfer of files to be shared and any changes made to those files. The agent 150 is also configured to interact with a file system 140 and any applications 145 that are operational on client device 100. Typically, file system 140 is implemented by the OS 751 and co-ordinates data access and storage on storage device 740. In the present example it will be assumed that the storage device of the client device is a local device. Application 145 is typically implemented by computer-program code loaded into working memory, as shown in FIG. 7, and may comprise any application known in the art. An example of application 145 is any of the Microsoft Office applications supplied by Microsoft Corporation (Word, Excel, Powerpoint etc.).

The agent 150 has a number of functions to enable successful collaboration. Collaboration involves the collective editing of a file or document by a plurality of users. Such a file or document will be referred to as a "shared file" and may be any form of electronic file or structured data, including, but not limited to: word processing, video, audio, presentations, or any combination of these. The method and system of the invention may also be used to provide a "chat" function, i.e. an electronic text dialogue, wherein the dialogue may comprise graphical elements. The functions of the agent include one or more of: selecting the optimum method for routing data between client devices over network 120; sending files that have been selected as shared, by a user of client device 100, to selected users of other client devices 130; writing files shared by a user of one of client devices 130 to the local file system 140 of client device 100; passing and committing changes made to shared files by users of the other client devices 130; sending changes made to local shared files to users with whom the file is shared; and persisting changes when the user is offline, i.e. not connected to network 120, so that they may be sent to other users when the client device 100 is back online. In general, in the following disclosure the word 'persist' or 'persistence' is used to describe the retention of information until such time as it can be applied to all users' files.

To fulfil the various functions described above, the architecture of the agent 150 is divided into three broad components: network manager 155, file system manager 160 and collaborative event manager 180. Collaborative event manager 180 may be a real-time or near real-time change manager. The network manager 155 provides an interface for communication over network 120, the file system manager 160 controls the storage of data on the local storage device, and a collaborative event manager 180 interfaces with application 145. A preferred embodiment of each manager is described below; however, deviations from each embodiment are possible while still maintaining the functional aspects of the agent of the present invention.

Figure 2:
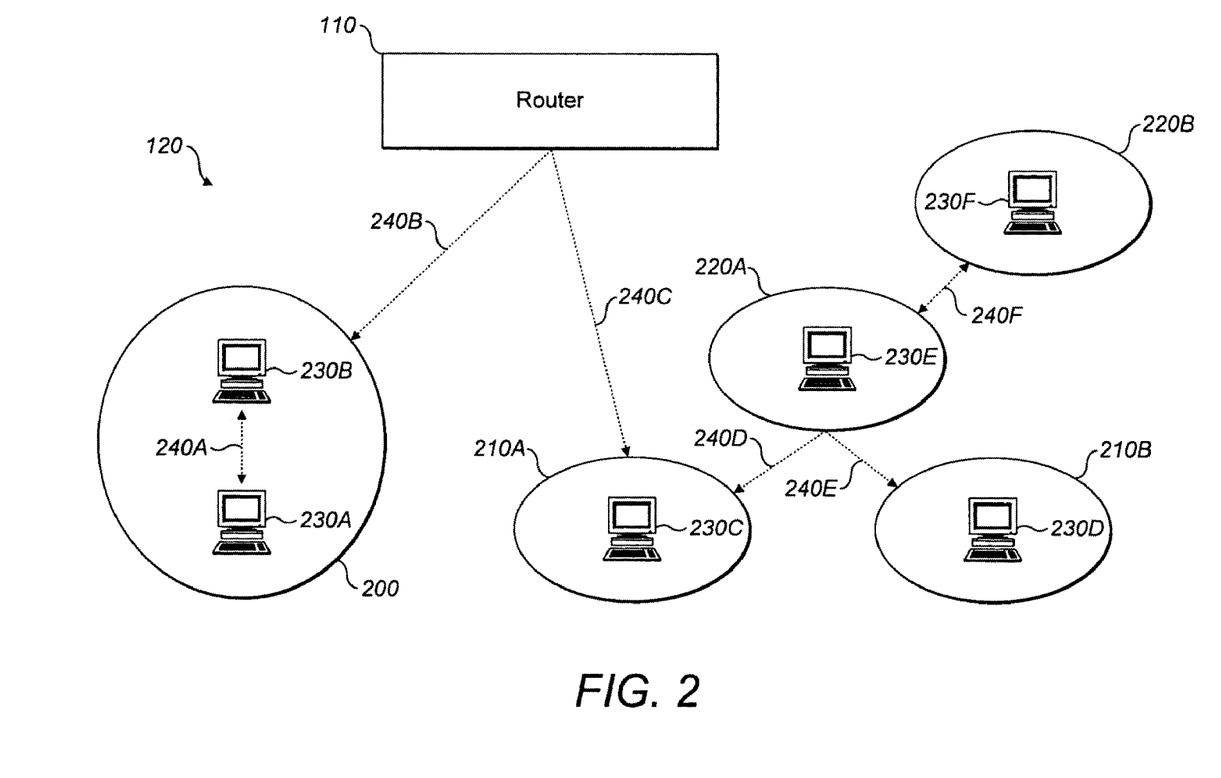
FIG. 2 shows an exemplary network arrangement illustrating a range of possible methods for communication between agents in accordance with the present invention.

The network manager 155 is used to pass copies of files to be shared between users' computers 130 using network 120, and subsequently to share changes that have been applied to open copies of these files. FIG. 2 illustrates a non-limiting number of possible configurations of network 120 and the routing strategies that may be employed by the network manager 155. In FIG. 2 computing systems 230 may be any of systems 100 or 130 from FIG. 1.

Network 120 may comprise a number of different configurations, wherein such configurations may be dynamic (i.e. change over time). FIG. 2 shows a corporate network 200 comprising two client devices 230A and 230B connected by a direct network connection 240A, for example an Ethernet LAN. Corporate network 200 has a software or hardware-implemented firewall, i.e. filters network traffic from and to particular subsets of IP addresses. While client devices within the corporate network 200 may freely communicate with each other it may not be possible for a client device outside of the network 200 to set-up a direct connection with a client device inside the network 200.

FIG. 2 also shows two separate home networks 210A and 210B. Each of these networks 210 may comprise one or more client devices 230C, 230D connected to a routing device or router (not shown). The router may also comprise a modem for connecting to an Internet Service Provider (ISP). Typically, the router in each network has a public IP address (i.e. a globally-unique IP address that any client device can access on the Internet) and maps this public address onto the private IP addresses of the client devices 230C, 230D within the home network. This is known as network address translation (NAT). Hence, it is not possible for a client device outside of each network 210 to set-up a direct connection with a client device 230C, 230D inside the network 210.

Finally, FIG. 2 shows two client devices 230E and 230F that each have public IP addresses. Such devices may be connected to open networks 220A and 220B. As these devices have a public IP address a client device outside of networks 220A and 220B may set-up a connection to the devices.

When passing data between two or more client devices, the network manager 155 needs to determine whether a direct connection is possible. Generally, a direct, or peer-to-peer, connection is preferred as any latency is minimised and the overall work performed by the system is reduced, i.e. using an intermediary increases the complexity of the system. To determine whether a direct connection is possible, network manager 155 uses the exemplary algorithm shown in FIG. 8.

Figure 8:
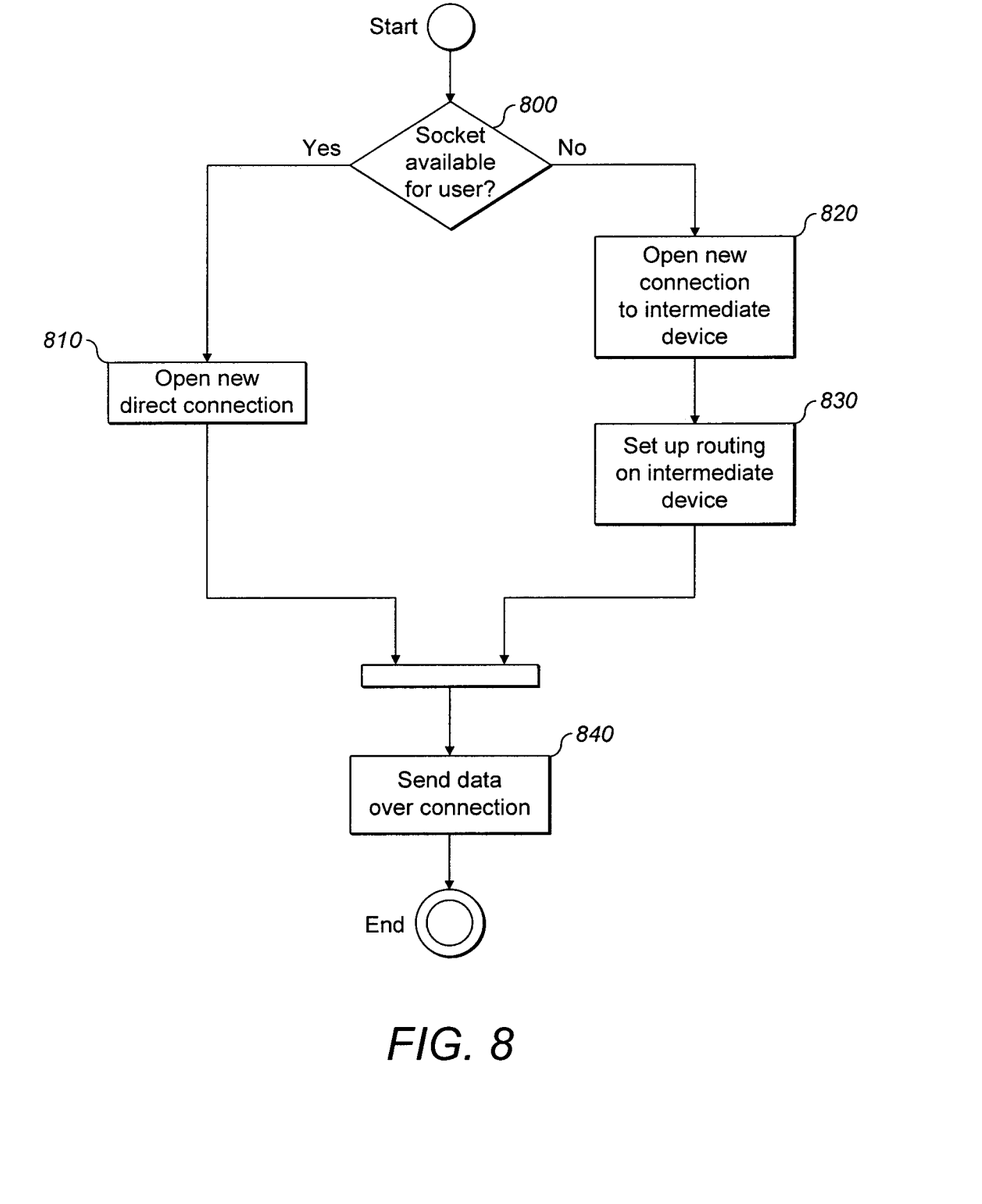
FIG. 8 shows the steps taken to set up a network connection.

At step 800 the network manager 155 on a first client device determines whether it can open a socket to the second client device. A socket is an end-point in the bi-directional communication link that provides an interface between the network manager 155 and the networking routines of the OS 751. In a TCP/IP network a socket requires an IP address and a port number.

In a preferred optional embodiment, router 110 may be used to determine whether a socket to the second client device can be opened in step 800. When a client device connects to the network 120 and begins to use the present collaboration system, the client device, or the user operating the client device, may authenticate itself (e.g. log-in) to router 110. If this is the case, the router 110 is then able to detect when a particular user and/or client device comes online. After authentication, the router 110 may also regularly communicate with the client device (e.g. may "ping" the client device) and await a reply to determine whether the client device is still connected to the network 120. By analysing the structure of the IP address associated with client communication, the router 110 may also be able to determine whether the IP address is associated with a public or private network (e.g. private IP addresses typically begin with the digits 192). Hence, by collating this information, the router 110 may generate connection data indicating whether a direct connection may be made to a particular client device. At step 800 in FIG. 8 the first client device may communicate with router 110 and indicate that it wishes to communicate with a particular user or client device. The router 110 may then interrogate the connection data and inform the first client device and/or its user whether a socket can be opened to the required client device (or the current client device of the required user) and possibly supply the first client device with the information required to make the direct connection.

In the case of communication between client devices 230A and 230B on corporate network 200 a socket is available for communication as both systems have a private IP address on the same network. Thus at step 810 the network manager can open a new direct connection 240A. In the case of communication between client devices 230E and 230F a socket is available for communication as both systems have a public IP address. Thus at step 810 the network manager can open a new direct connection 240F. In both these cases peer-to-peer communication, i.e. data transfer, is possible over the connection at step 840.

In the case of communication between client devices 230B and 230C a socket is not available for communication as client device 230B is "hidden" from public access by the firewall on corporate network 200 and client device 230C is "hidden" from public access by the NAT implemented on the home network 210A. In this case the network manager 150 on a first of the client devices, say 230B, opens a new connection with a known intermediate device at step 820. This intermediate device is a device with a public IP address whose details are stored in configuration data accessible by the network manager 155. The intermediate device may be router 110 or a client device 230E, 230F with a public IP address. In FIG. 2, client device 230B sets up a direct connection with router 110, for example over the Internet. At the same time client device 230C also sets up a direct connection 240C with router 110. The router is then configured for routing data at step 830. Router 110 then routes traffic between the two client devices 230B and 230C to enable communication between the two systems.

A similar set of steps may also be performed to enable client device 230E to mediate traffic, i.e. route data, between client devices 230C and 230D. In this case, a first direct connection 240D is set-up between client devices 230C and 230E and second direct connection 240E is set-up between client devices 230D and 230E. Hence, in FIG. 2, router 110 and client device 240E become proxies which the users' devices are able to communicate with to send data at step 840.

Returning to FIG. 1, file system manager 160 provides an interface between the agent 150 and the file system 140 of the client device 100. The file system manager 160 has three broad tasks: to create copies of shared files within file system 140; to retain changes made to locally edited files when a user is offline; and to share such changes immediately across the internet when a connection is available. As such, the file system manager 160 comprises a file generator component 165 responsible for the first task and an offline component or manager 170 responsible for the second and third tasks.

The file system manager 160 communicates with the network manager 155 in order to receive files from other users (e.g. from client devices 130), and to transmit changes which have been stored while the user is offline. Through file generator 165 and offline component 170, the file system manager 160 is able to communicate with the file system 140 of the client device 100. This enables the file manager 165 to store files for sharing that are received from other selected users and to store changes made to local copies of files while the user of client device 100 is offline. These latter changes must persist on file system 140 until the user is online.

The file system manager 160 also has an interface with the collaborative event manager 180. This allows the collaborative event manager 180 to inform the file system manager 160 of changes that the user has made to local copies of shared files while the user of client device 100 is offline.

The collaborative event manager 180 is used both to detect changes made to a file by application 145 during local editing, and to apply changes received from other client devices 130 via network manager 155 to a local copy of the file. In order to do this, the real time change manager 180 consists of a number of components.

A first component is responsible for determining whether the user is online or offline. This may be determined by communicating with the network manager 155 to check whether the user is connected to the network 120 or has recently communicated with router 110. If the user is online, changes made locally need to be sent to collaborators, i.e. others users with whom the user of client device 100 has decided to share the file. Alternatively, if the user is offline, the changes need to persist, using the interface with the file system Manager 160, until such a time that the user is online.

A second component is a collection of document handlers 185, wherein each handler is responsible for managing a given file or document in a particular application. For example, User A may edit a shared spreadsheet with Excel, whereas User B may edit the spreadsheet with OpenOffice. Thus two document handlers will be provided, one for Excel and one for OpenOffice. The collaborative event manager 180 will execute the appropriate document handler based on a detected or registered editing application; in each case the handler may bind to the editing application in a different way. Each document handler is responsible for transforming any data generated in an application-specific format into a format that is independent of the application used.

A third component comprises an integration layer 190 between the agent 150 and the application 145 a given document is being edited within. The integration layer 190 specifies a set of integration methods that are executed to integrate the agent 150 into the application 145. These methods may be extended, each handler may use a different set of methods and each method may be employed by more than one handler.

A non-limiting example of an integration method will now be described in relation to the application Microsoft Excel. In this case, integration of the agent 150 into the Excel application 145 is achieved asymmetrically by using a Component Object Model (COM) interface 191 and a local HyperText Transfer Protocol (HTTP) webserver 192 embedded in the integration layer 190. Changes received from selected users of other client devices 130 are applied using the COM interface 191 and changes made by the user of client device 100 are published from an add-in Excel component to the local webserver 192. The webserver 192 then sends such changes out via network manager 155 and the network 120 to collaborators. The add-in may be seen as a component of the agent 150 that is installed within the application. The webserver 192 may comprise a java webserver that is integrated into the agent 150. In other embodiments, an application may have a well-defined application program interface (API) that avoids the need for an add-in.

To detect changes made to a file loaded within the application 145 the add-in discussed above registers a Visual Basic listener on the file. This listener monitors the application for particular events, i.e. actions that occur within the application, as defined within Visual Basic. A key feature of a preferred embodiment of the present invention is that the changes are detected without modification of the file or document. Each event triggers a function in the add-in that determines what, if anything, has changed within the file or application. For example, User A may set the value of Cell A2 to "45" and the font style for that cell to "bold". These are changes that are relevant to other users' copies of the document, i.e. are "interesting changes" and therefore need to be transmitted to the client devices 130 of other users and applied to any copy of the file that they edit. In contrast, opening a popup menu would not constitute an interesting change as it does not affect the file once it is saved back to disk.

In a preferred embodiment, change is determined by constructing and comparing data trees representing all or some sub-set of a document on receipt of an event. These data trees comprise change data to be sent to other users. For example, when a user selects cell A2, the add-in receives a SheetChangeEvent. On receipt of the event, the add-in examines cell A2 and constructs a data tree representing its details; the data tree for the example above would appear as follows:

```
<Map name="Range">
    <Property name="address" value="A2">
    <Property name="value" value="45">
    <Map name="Font">
        <Property name="style" value="Bold">
        <Property name="color" value="Black">
    </Map>
<Map>
```

When a subsequent SheetChangeEvent event is received by the add-in, it constructs a new data tree; for example if User A was to change the value of cell A2 to "42" and the font to "italic" the following data tree may be constructed:

```
<Map name="Range">
    <Property name="address" value="A2">
    <Property name="value" value="42">
    <Map name="Font">
        <Property name="style" value="Italic">
        <Property name="color" value="Black">
    </Map>
</Map>
```

In order to reduce the amount of data exchanged, the add-in then constructs a data tree that represents only the features that have changed; in this case font colour is not represented because it has not changed:

```
<Map name="Range">
    <Property name="address" value="A2">
    <Property name="value" value="42">
    <Map name="Font">
        <Property name="style" value="Italic">
    </Map>
</Map>
```

Interesting changes are packaged as a set of key values that represent no more than the change itself. The examples above are set out in an extended Markup Language (XML) type format for clarity and should not be seen as limiting. Preferably, each discrete change is given a unique identifier. Depending on the current connectivity of the present client device and any relevant client devices, the change data may then be sent to the client devices of other users or the router 110 via the HTTP webserver 192. This process is described in more detail below. The agent 150 may pass change data to the HTTP webserver 192 by employing an Excel Web Query on a worksheet that is set not to be visible to the user.

FIGS. 3 to 6 show various methods which illustrate how the present invention may be used to collaborate on files.

Figures 3, 4:
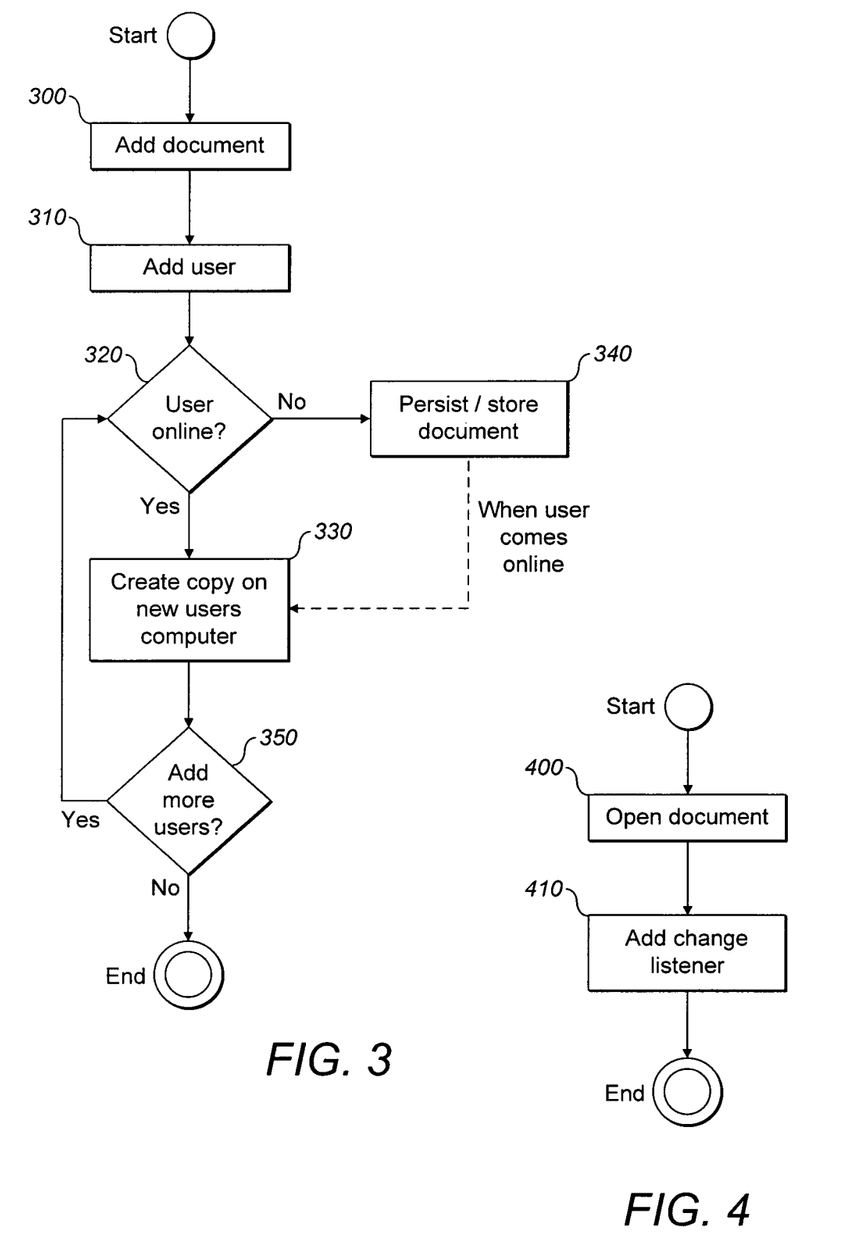
FIG. 3 shows the steps taken to share a document between users.
FIG. 4 shows the steps taken to identify change in a document.

FIG. 3 illustrates the initial steps taken by a user to share the document, and will be explained from the point of view of a user of one of client devices 130. The user first selects the file or document to add to the system at step 300. This may be achieved using a suitably configured user interface (UI). For example, the UI may be provided by a HyperText Markup Language (HTML) page that offers users an "Add File" control. The user may then click on the control and select the file or document from the file system of their device using a standard file system explorer. At step 310 the user then adds a first user with which they wish to share the file or document. For example, the user may select a particular user from a drop-down box in the UI that contains a number of pre-registered users.

In the present example, we will assume that the first user is the user of client device 100. After adding a first user, the agent of client device 130 determines whether the added user is online at step 320. Typically, this is achieved by exchanging data via network manager with agent 150 present on the client device 100 of the added user. The network manager 150 may use the method described earlier in relation to step 800 of FIG. 8. If the first user is online then a copy of the document is created on that user's client device at step 330. This may be achieved using the agent 150 and file system manager 160, wherein the file generator 165 of the agent stores a local copy of the file or document in the file system 140 of the added user. If the initial user wishes to share the document with further users, these further users may be added at step 350. In an alternate embodiment, step 350 may be performed before step 320, and steps 320 to 330 may be performed as a batch process for all added users. If there are no more users to be added then the process ends.

FIG. 4 illustrates the method in which an agent 150 acts to listens for changes made to a file or document. This method may be performed on the copy of the file or document that was generated in step 330 in the method of FIG. 3 or may be applied to any other shared file or document. It may also be performed on client device 100 or any one of client devices 130. When the file or document is opened on the client device 100 at step 400, the agent 150 adds a listener to the application 145 at step 410 through the COM API. This allows the agent 150 to become aware when changes are made to the file or document.

Figure 5:
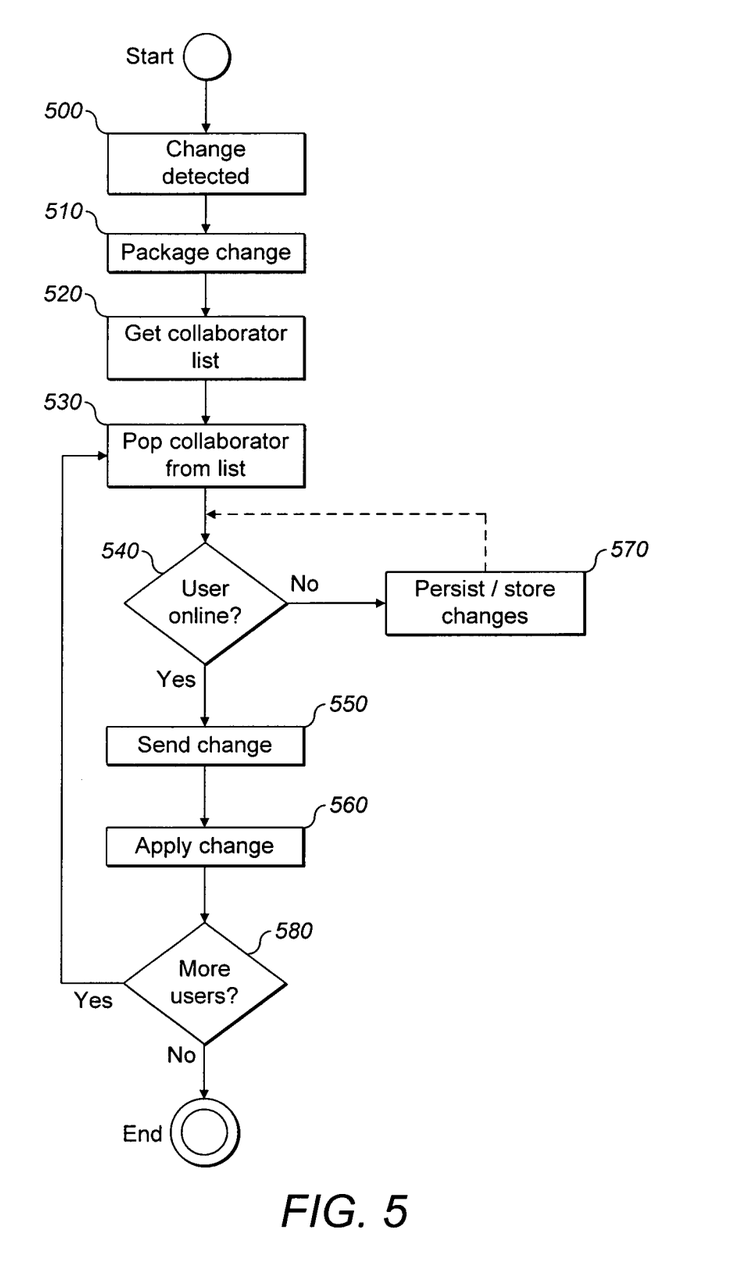
FIG. 5 shows the steps taken to propagate changes between users.

FIG. 5 illustrates the steps taken to propagate a change in a file or a document when it is detected. Such a method may be performed using agents installed on any of client devices 100, 130; however, for clarity the method will be described from the perspective of client device 100. Firstly, at step 500, the agent 150 detects the change. As discussed previously, for Excel this may involve monitoring a change event and constructing change "data trees", in other embodiments this may involve the use of an application API. The change is then packaged for transmission across the network 120 at step 510. This may involve publication of the changes to an HTTP webserver 191 in an integration layer 190 of a collaborative event manager 180.

At step 520, the agent 150 retrieves a list of the users with which the file or document is being shared. If there are one or more users, the agent 150 retrieves the details of a first user on the list at step 530 and establishes whether that user is online at step 540. Again, this may be performed using the network manager 155 as described in relation to step 800 of FIG. 8. If the user is online, i.e. connected to network 120, then the changes are sent across the network 120 at step 550. If the user is not online, the network manager may intermittently check the status of the user, i.e. check whether they are connected to the network using a peer or client device, to determine when they do come online. Such a process is optional as shown by the dotted line in FIG. 5 and may occur as a background thread or process. Communication of data representing the changes is typically managed by network manager 155 of client device 100 working with the network manager of any receiving client device 130. Such communication may take any of the forms described in relation to FIG. 2.

At step 560 the agent on the first user's client device 130 receives the data from the network 120 via its network manager and passes it to the collaborative event manager. If the first user has the file or document in question open on their device then changes are applied to the file or document via the appropriate document handler and components in the integration layer. If the first user does not have the file or document in question open on their device then changes are sent to the file system manager via the interface with the collaborative event manager. In a preferred variation, such changes are then stored by the offline component. These changes are applied to the file or document next time it is opened on the client device 130. In an alternative embodiment, the offline component 170 may be adapted to apply the changes to the copy of the file stored within file system 140 without the use of application 145; for example, offline component 170 may apply changes at the binary level to the file. The initial user's agent 150 repeats this process at step 580 until all users are accounted for.

Figure 6:
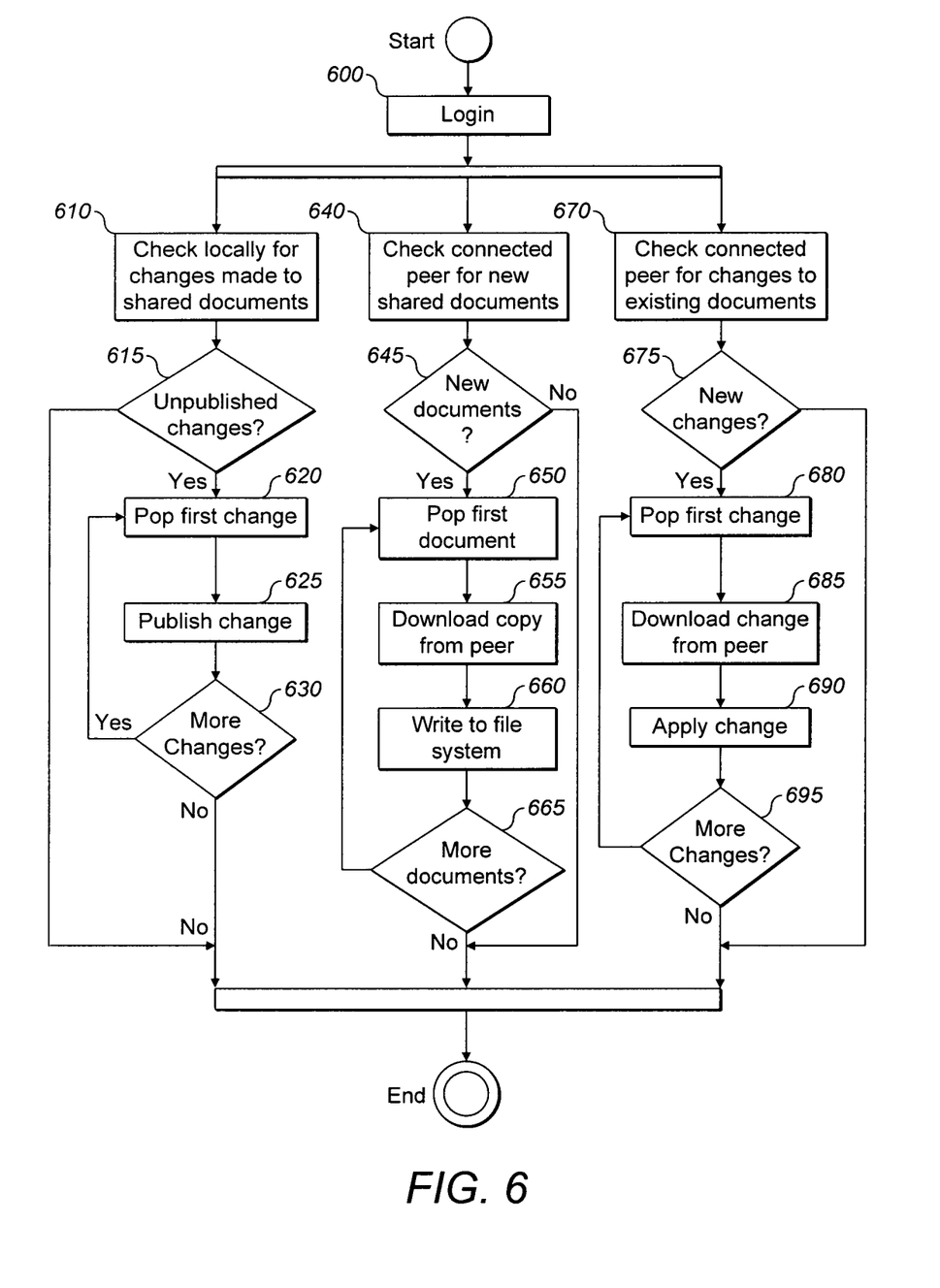
FIG. 6 shows the steps taken when a user becomes online.

FIG. 6 illustrates the steps taken by an agent when a user initially comes online. The method will be described from the perspective of client device 100. When the client device 100 connects to network 120, the agent 150 must check at least the following: whether any changes have been made locally to any shared files or documents; whether there are new files or documents that have been allocated for sharing with that user by other users of the system; and whether other users have made changes to existing shared documents.

At step 600, the user logs in to the system. This may involve the user authenticating themselves to the agent 150 through a log-in screen. This step may also involve setting up an initial connection to router 110 and/or may involve the steps discussed in reference to step 800 of FIG. 8. The agent 150 then implements the following processes or threads in parallel.

In the first process or thread, the agent 150 checks locally for changes made to shared files or documents at step 610. If there are any changes that have not yet been published (i.e. have not gone through the steps described in FIG. 4), the agent 150 identifies these at step 615. Each such change is then retrieved at step 620 and published at step 625. Typically, a data structure such as a list or queue is used by offline component 170 to manage any changes that have not yet been published. The network manager 155 may then be configured to process this data structure and communicate the changes to the appropriate parties. At step 630 the agent 150 determines whether there are any more changes to be published and, if so, repeats steps 620 and 625 until all changes have been published, e.g. until all identified changes within the data structure have been processed.

The second process or thread involves checking for new shared files or documents. At step 640, the agent 150 communicates with other connected clients, i.e. one or more peer devices, via network manager 155 and checks for any new shared files or documents. If the agent finds that there are new shared files at step 645 then each is retrieved in turn. At step 650 the first available file or document from connected clients is selected. The new document is then downloaded from a peer at step 655 using the network manager 155. The file or document is then passed to the file system manager 160 which uses file generator 165 to write the file or document to the user's file system 140 at step 660. At step 665 a check is made as to whether any more files or documents exist on any peer; if they do then steps 650 to 665 are repeated until all files or documents have been downloaded.

The third process or thread involves checking one or more peer devices for any changes to existing documents. At step 670, the agent 150 checks with its peers for any unapplied changes that have been made to one or more files or documents that have already been locally stored on file system 140. In an optional preferred embodiment, each change is uniquely identifiable. Hence, the agent 150 can track whether a particular change has been applied or downloaded by a particular user. If any changes are found at step 675 then they are individually retrieved from an arbitrary peer with those changes available at step 680, downloaded from said peer at step 685, and applied to the appropriate file or document at step 690 using collaborative event manager 180. The agent 150 then checks for more changes at step 695 and repeats steps 680 to 695 until all changes have been applied. Preferably, the source peer keeps track of each change and the users to whom it must be distributed, once a change has been downloaded or consumed by a user then it may be removed from peer and/or archived.

It is important to note that while the present invention has been described in a context of a fully functioning data processing system, those of ordinary skill in the art will appreciate that the processes of the present invention are capable of being distributed in the form of a computer readable medium of instructions and a variety of forms and that the present invention applies equally regardless of a particular type of signal bearing media actually used to carry out distribution. Examples of computer readable media include recordable-type media such as floppy disks, a hard disk drive, RAM and CD-ROMs as well as transmission-type media such as digital and analogue communications links.

Generally, any of the functionality described in this text or illustrated in the figures can be implemented using software, firmware (e.g., fixed logic circuitry), manual computer-implemented processing, or a combination of these implementations. The terms "component" or "functionality" as used herein generally represents software, firmware, or a combination of software and firmware. For instance, in the case of a software implementation, the terms "component" or "functionality" may refer to program code that performs specified tasks when executed on a processing device or devices (e.g., processor(s) 720). The program code can be stored in one or more computer readable memory devices as described above. The illustrated separation of components and functionality into distinct units may reflect an actual physical grouping and allocation of such software and/or hardware, or can correspond to a conceptual allocation of different tasks performed by a single software program and/or hardware unit.

The invention claimed is:

1. A computer-implemented method for enabling collaboration in editing of a file, the method comprising:

in a client device having an agent running therein, the agent detecting changes made to an open copy of the file that is open in the client device;

in the client device and responsive to detecting the changes, the agent identifying a list of one or more users with which the file is shared and determining intermittently whether the client device can connect with one or more further client devices connected to a network and associated respectively with the one or more users, including determining whether a peer-to-peer connection can be made and, in response to determining that the peer-to-peer connection cannot be made, determining whether an intermediate connection can be made;

in the client device, when both the peer-to-peer connection and the intermediate connection cannot be made, persisting the detected changes; and, when at least one of the peer-to-peer connection and the intermediate connection can be made, selectively transmitting the changes across the network to said one or more further client devices, thereby instructing one or more respective agents to apply said changes to respective copies of said file.

2. The computer-implemented method of claim 1, further comprising:

receiving other changes from one or more other agents over the network; and applying the other changes to the open copy of the file associated with the client device.

3. The computer-implemented method of claim 2, wherein the other changes are applied using an application associated with the client device.

4. The computer-implemented method of claim 1, further comprising:

in the client device, receiving notification of a new shared file over the network; and in the client device, generating a new copy of the new shared file that is associated with the client device.

5. The computer-implemented method of claim 1, wherein the step of selectively transmitting comprises only transmitting the changes to one or more further client devices connected to the network that are associated with users with whom the file has been shared.

6. The computer-implemented method of claim 5, wherein the client device is associated with a user through the presence of the agent registered to the user.

7. The computer-implemented method of claim 1, wherein step of selectively transmitting comprises:

if the peer-to-peer connection can be made, making said peer-to-peer connection; and if the peer-to-peer connection cannot be made and the intermediate connection can be made, making the intermediate connection with an intermediate device to route data to a selected client device.

8. The computer-implemented method of claim 1, wherein the changes are made by a first user to the open copy of the file, the open copy of the file being created in working memory for real-time editing by a file-editing application when the first user opens the file.

9. The computer-implemented method of claim 1, wherein the one or more further client devices are associated with the one or more respective users sharing the file, the application of the changes being applied to memory copies of said file by file-editing applications operated by the one or more respective users, said memory copies being created when the one or more respective users open the file.

10. The computer-implemented method of claim 1, whereby the one or more respective agents apply said changes to respective open copies of said file.

11. The computer-implemented method of claim 1, wherein the changes are detected without modifying the open copy of the file.

12. The computer-implemented method of claim 1, wherein the step of detecting changes further comprises:

loading an appropriate document handler that is adapted to interact with an application being used to edit the file;

wherein the document handler transforms the changes from a format specific to the application to an application-independent format.

13. A computer program product comprising computer executable instructions for carrying out the computer-implemented method of claim 1.

14. An apparatus comprising:

one or more recordable-type computer readable media, wherein the recordable-type computer readable media does not comprise transmission-type media;

a processor in a client device, operably coupled with the one or more recordable-type computer readable media; and program instructions stored on the one or more recordable-type computer readable media and executable by the processor in the client device, the program instructions comprising an agent for enabling collaboration in the editing of a file, the agent comprising:

a collaborative event manager to detect changes made to an open copy of the file that is open in the client device;

a network manager to, responsive to detecting the changes, identify a list of one or more users with which the file is being shared and determine intermittently whether the client device can connect with one or more further client devices connected to a network and associated respectively with the one or more users, wherein to determine whether the client device can connect, the network manager at least determines whether a peer-to-peer connection can be made and, in response to determining that the peer-to-peer connection cannot be made, determines whether an intermediate connection can be made; and an offline manager in the client device and coupled to the network manager to persist changes detected by the collaborative event manager when both the peer-to-peer connection and the intermediate connection cannot be made;

wherein the network manager is adapted to selectively transmit the changes across the network to one or more of the said further client devices when at least one of the peer-to-peer connection and the intermediate connection can be made, thereby instructing one or more respective agents to apply said changes to respective copies of said file.

15. The apparatus of claim 14, wherein:

the network manager is adapted to receive other changes from one or more other agents over the network relating to the shared file; and the collaborative event manager is adapted to apply said other changes to a copy of the file associated with the client device.

16. The apparatus of claim 15, wherein the collaborative event manager is adapted to apply said other changes using an application loaded upon the client device.

17. The apparatus of claim 14, wherein the agent further comprises:

a file system manager to receive notification of a new shared file from the network manager and generate a copy of said new shared file that is associated with the client device.

18. The apparatus of claim 17, wherein the file system manager is adapted to interact with a file system of the client device.

19. The apparatus of claim 14, wherein the offline manager is adapted to interact with a file system of the client device.

20. The apparatus of claim 14, wherein the offline manager is adapted to receive changes from the collaborative event manager when the copy of the file is not open.

21. The apparatus of claim 20, wherein the offline manager is adapted to apply the changes to the copy of the file when said copy is not open.

22. The apparatus of claim 14, wherein, when the client device connects to the network, the network manager is adapted to selectively transmit any changes that were stored by the offline manager.

23. The apparatus of claim 14, wherein the network manager selectively transmits the changes to one or more further client devices connected to the network that are associated with users with whom the file has been shared.

24. The apparatus of claim 23, wherein the client device is associated with a user by the presence of the agent registered to the user.

25. The apparatus of claim 14, wherein the network manager is adapted to:
if the peer-to-peer connection can be made, make the peer-to-peer connection; and
if the peer-to-peer connection cannot be made and the intermediate connection can be made, make the intermediate connection with an intermediate device to route data to a selected client device.

26. The apparatus of claim 14, wherein the changes are made by a first user to the open copy of the file the open copy being created for real-time editing in working memory by a file-editing application when the first user opens the file.

27. The apparatus of claim 14, wherein the one or more further client devices are associated with the one or more respective users sharing the file, the application of the changes being applied to memory copies of said file by file-editing applications operated by the one or more respective users, said memory copies being created when the one or more respective users open the file.

28. The apparatus of claim 15, wherein the collaborative event manager further comprises a monitor component to detect changes made to the open copy of the file without modifying said copy.

29. The apparatus of claim 14, wherein the one or more respective agents apply said changes to respective open copies of said file.

30. The apparatus of claim 14, wherein the collaborative event manager comprises:
a document handler to interact with an application being used to edit the shared file;
wherein the document handler transforms the changes from a format specific to the application to an application-independent format.

* * * * *